UNITED STATES PATENT OFFICE.

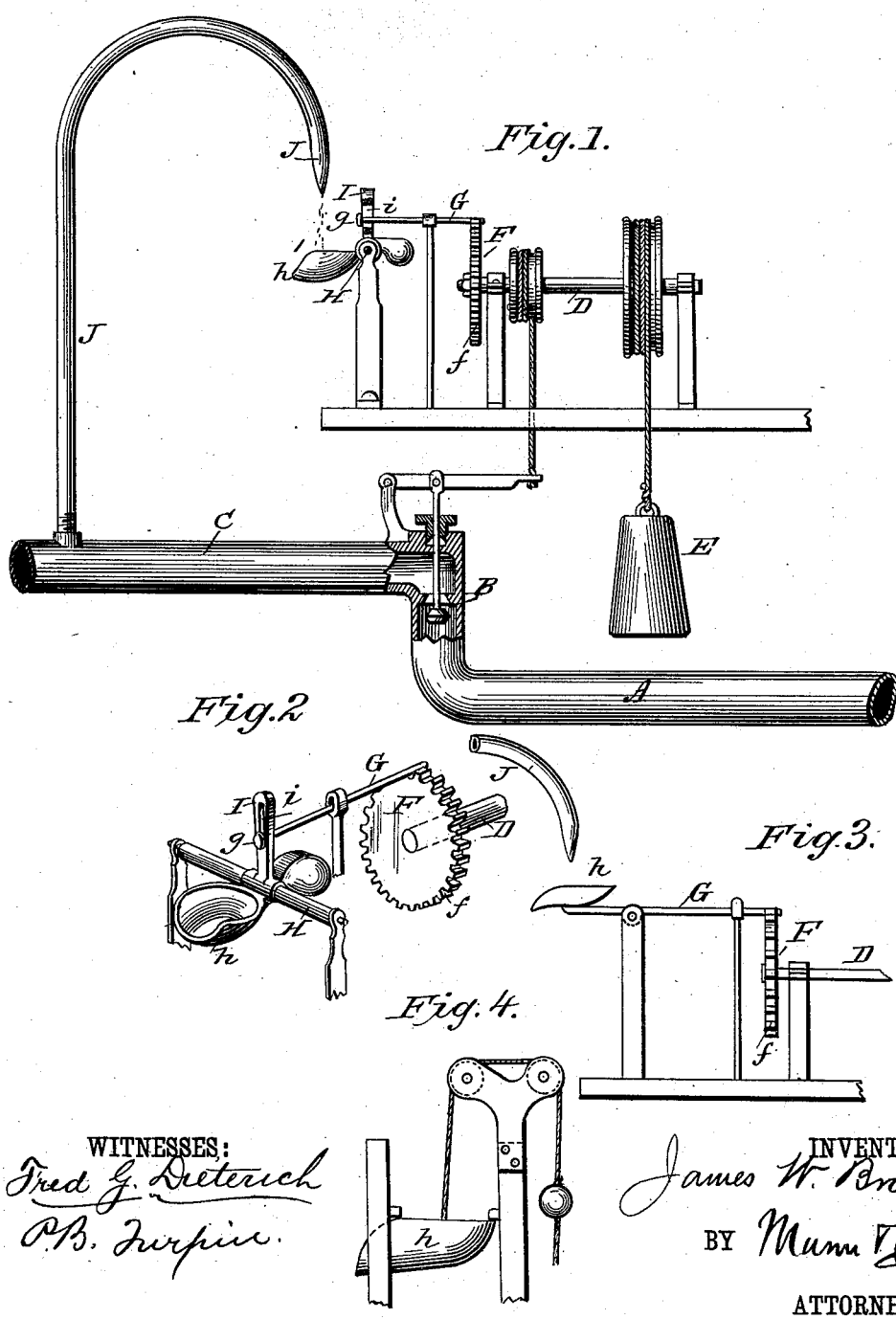

JAMES W. BROOK, OF LYNCHBURG, VIRGINIA.

AUTOMATIC DEVICE FOR SHUTTING WATER-COCKS, &c.

SPECIFICATION forming part of Letters Patent No. 376,287, dated January 10, 1888.

Application filed November 26, 1886. Serial No. 220,089. (No model.)

*To all whom it may concern:*

Be it known that I, JAMES W. BROOK, of Lynchburg, in the county of Campbell and State of Virginia, have invented a new and useful Improvement in Automatic Devices for Shutting Water - Cocks, Windows, &c., of which the following is a specification.

My invention is an improved device for automatically stopping the flow of water, to open or close a window, or other device governing a ventilating opening, or for operating any other device desired under the influence of variations in temperature; and the invention consists in certain features of construction and novel combinations of parts, as will be described.

In the drawings, Figure 1 is a side elevation of my improvements, parts being shown in section. Fig. 2 is a detail view of the detent mechanism. Fig. 3 shows a somewhat different arrangement of the detent mechanism, and Fig. 4 shows a somewhat different manner of supporting the drip-bearing and of connecting it with the valve or other device to be operated.

I have shown my invention in its application to stopping off the supply of water to a service or other pipe, and in such construction the pipe A has a valve, B, by which to shut off the water from the service-pipe C in the operation of the device. The valve may be of the form shown, or it may be of any other form desired, as will be readily understood.

In carrying out the invention a suitable frame is provided, in which is supported a shaft, D. To this shaft is connected a weight, E, by which the shaft is given a rotary tension, and the shaft is suitably connected, it may be as shown, with the valve or other device to be operated.

The connection with the valve or other device to be operated may be effected in various ways, and it will also be seen that the shaft may be given a rotary tension in various ways other than that shown—as by means of a spring; or, if desired, the shaft may be adapted to exert a torsional strain sufficient to operate the valve or other device, the shaft in such instance being fixed to a support; but the construction as shown may be preferred.

To the shaft is secured a detent plate or disk, F, having openings or notches $f$, fitted to be entered by the point or one end of the detent-key G. The opposite end of this key is connected with a shaft, H, which carries a movable drip receiver or lever, $h$. By preference, I form the connection of key G and shaft H through the medium of a crank, I, on the shaft, having a slot, $i$, through which one end of key G passes, and the key has a head, $g$, in advance of the crank I, to permit said crank to draw the key out of engagement with the detent-plate F in the operation of the device.

The dripper is located above the drip-receiver, being in the construction shown a nozzle at the end of a pipe, J, extended up from the water-pipe and arranged to discharge onto the movable drip-receiver.

When the device is used in connection with greenhouses to regulate ventilating-openings, or for other desired purposes, when it is not convenient to run a water-pipe in position to drip onto the drip-lever, a tub, tank, or other vessel may be arranged to contain water to drip on the lever.

The operation is simple and will be readily understood. In operation the detent is released and the weight wound up, or the shaft is otherwise adjusted to position for opening the valve or to properly set any other device it is desired to operate. The detent-key is then adjusted into engagement with the detent-plate, the parts being in the position shown in full lines in Fig. 1. Now, in non-freezing weather, the water dripping at 1 onto the drip-lever will flow off thereof, and the arrangement of the parts will not be disturbed. When the temperature lowers to freezing-point, the water freezing on the drip-receiver accumulates, and as the accumulation increases the drip-receiver lowers, the key is drawn out of the detent-plate, and the shaft is turned to operate the device sought to be actuated.

In Fig. 3 the drip device and drip-receiving point are the same as that shown in Fig. 1; but instead of the sliding key the drip-receiver is extended to form a key which moves radially into and out of the notches of the detent-plate, instead of laterally, as in the construction shown in Fig. 1.

The apparatus is simple, and will be found to efficiently serve the desired purpose.

Manifestly in the use of my invention it may be applied to hydrants and other appliances used in water-service, or in other connections where it is desired to regulate certain devices according to the temperature.

Now it is obvious that instead of supporting the movable drip-receiver pivotally, as shown, it might be arranged, as shown in Fig. 4, to be depressed vertically by the accumulation of ice thereon, and might in such instance be connected by a cord or other expedient directly with the valve or other device to be operated. This, it will be understood, would involve no departure from the broad principles of this particular feature of my invention; but I prefer the construction as shown and before described.

Having thus described my invention, what I claim as new is—

1. In an apparatus, substantially as described, the combination of a dripper and a movable drip-receiver consisting of a counterbalanced open-ended trough or spout arranged to receive the discharge from said dripper, the counterbalancing weight or resistance being sufficient to retain the receiver in position against the weight of the water and the force of the falling water, but not to retain it in position against the weight of accumulated ice, and means for connecting said receiver with the device to be operated, all being constructed and arranged substantially as described, whereby the drip will normally not disturb the receiver, but the accumulation of ice resulting from said drip at a low temperature will effect a depression of the receiver, substantially as and for the purposes specified.

2. The combination of a shaft, D, connections between said shaft and the device to be operated, a dripper, a movable counterbalanced drip-receiver arranged to receive the discharge of said dripper, and detent mechanism between the drip-receiver and the shaft D, the counterbalancing weight or resistance to said receiver being sufficient to retain it in position against the weight of the water and the force of the falling water, but not to retain it in position against the weight of the accumulated ice, all being constructed and arranged substantially as described, whereby the drip will normally not disturb the receiver, but the accumulation of ice resulting from said drip at a low temperature will effect a depression of the receiver, substantially as and for the purposes specified.

3. The combination, with the drip-receiver and the shaft provided with a detent-plate having a notch or opening, of a key, G, connected with the drip-receiver and arranged to enter and normally occupy the notch or opening of the detent-plate, and connections for joining said shaft with the device to be operated, substantially as set forth.

4. The combination of shaft D, provided with detent-plate F, having an opening or notch, $f$, the drip-receiver pivotally supported and having a crank, I, the key G, connected with crank I and movable longitudinally into and out of the opening $f$ of the plate F, and connections for joining said shaft with the device to be operated, substantially as set forth.

5. An apparatus, substantially as described, comprising a dripper, a movable counterbalanced drip-receiver arranged to receive the discharge from said dripper, and means for connecting the receiver with the device to be operated, the counterbalancing weight or resistance being sufficient to retain the receiver in position against the weight of the water and the force of the falling water, but not to retain it against the weight of accumulated ice, whereby the drip will normally not disturb the receiver, but the accumulated ice resulting from said drip at a low temperature will effect a depression of the receiver, substantially as and for the purposes specified.

JAMES W. BROOK.

Witnesses:
P. B. TURPIN,
SOLON C. KEMON.